Patented June 12, 1951

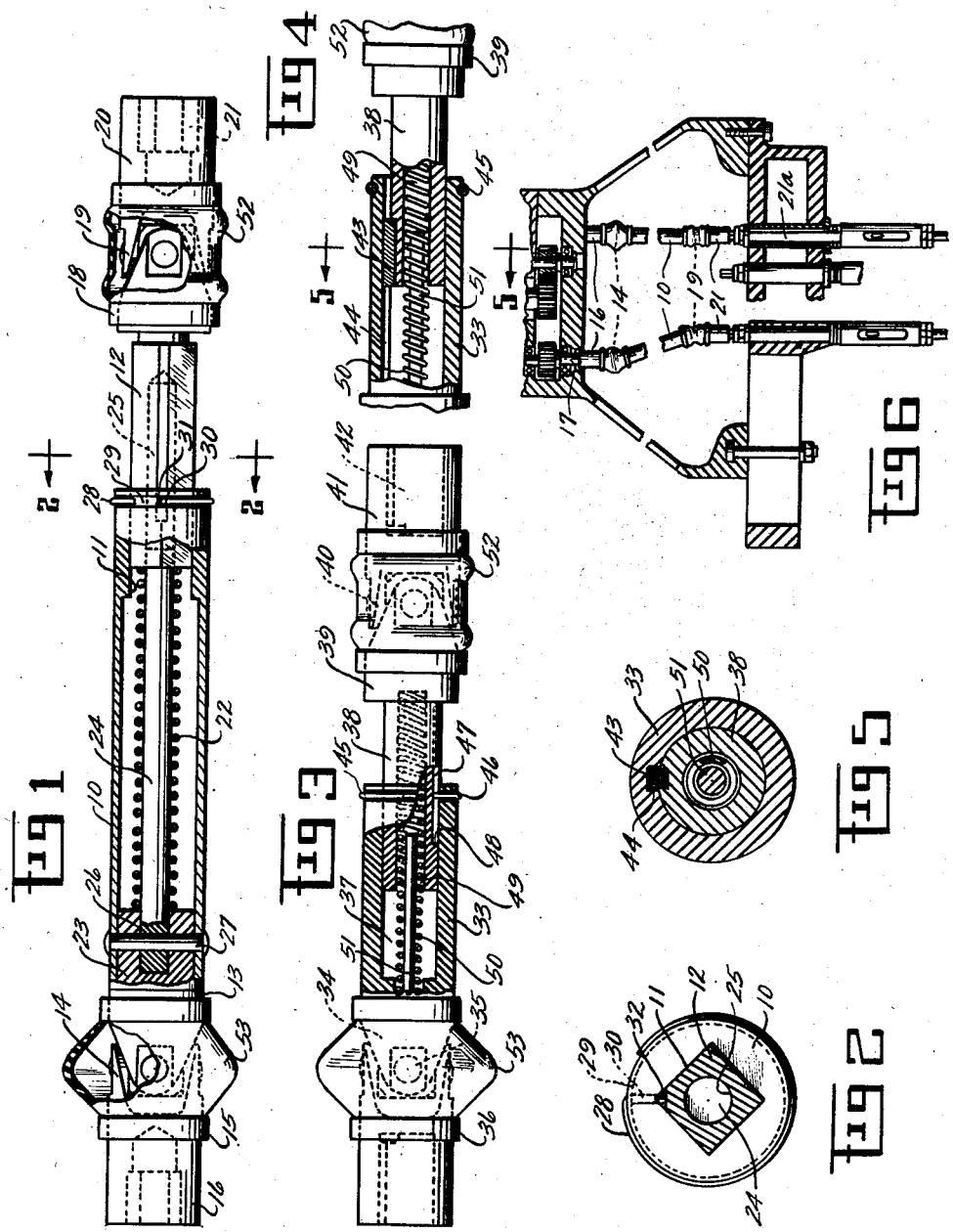

2,556,380

UNITED STATES PATENT OFFICE 2,556,380

FLEXIBLE DRIVING UNIT FOR CONNECTING DRIVING MEMBERS WITH DRIVEN MEMBERS

George B. Stillwagon, Jr., Dayton, Ohio, assignor of one-half to Kenneth G. Fraser, Dayton, Ohio Application October 31, 1947, Serial No. 783,241

5 Claims. (Cl. 64—1)

This invention relates to a flexible driving unit for connecting a driving member with a driven member, and is particularly well adapted for use in a multiple spindle drill head or the like.

One object of the invention is to provide a driving unit which can be quickly and easily attached to and detached from the driving and driven members, both when the driven member is in axial alinement with the driving member and when the driven member is laterally offset with relation to the axis of the driving member.

A further object of the invention is to provide a longitudinally extensible driving unit which is yieldably urged to an extended position to establish and maintain the connections between the same and the driving and driven members and to compensate for variations in the distance between the driving and driven members.

A further object of the invention is to provide a driving unit comprising a universal joint assembly in which the universal joints are movable lengthwise of the assembly with relation one to the other and are yieldably urged in opposite directions.

A further object of the invention is to provide a longitudinally extensible driving unit including universal joints and of such a character that it may be easily assembled and disassembled.

Other objects of the invention may appear as the device is described in detail.

In the accompanying drawings Fig. 1 is a side elevation, partly in section, of a driving unit embodying the invention; Fig. 2 is a transverse section taken on the line 2—2 of Fig. 1; Fig. 3 is a side elevation of a slightly modified form of driving unit, partly in section; Fig. 4 is a longitudinal section of a portion of the unit taken in a plane at right angles of the section of Fig. 3; Fig. 5 is a transverse section taken on the line 5—5 of Fig. 4; and Fig. 6 is a sectional view of a multiple spindle drill head, partly broken away, and equipped with two of said driving units.

In these drawings I have illustrated one embodiment of the invention, together with a minor modification thereof, and have shown the same as designed primarily for use in a multiple spindle drill head, but it is to be understood that the device as a whole, as well as the several parts thereof, may take various forms and may be used for various purposes without departing from the spirit of the invention.

Preferably the driving unit comprises a longitudinally extensible structure having at its respective ends universal joints one of which has means for quickly and easily connecting the unit with a power operated element, such as a driving member of a multiple spindle drill head, and the other of which has means for connecting the unit with an element to be driven, such as the spindle of a drill head, said unit also having means tending constantly to extend the same and to yieldably resist the contraction thereof, the inner members of the two universal joints being connected for rotation in unison about a common axis.

In the form shown in Figs. 1 and 2 the driving unit comprises a tubular element 10 having at one end thereof a non-circular guideway 11, here shown as square in cross section, and a second element slidably mounted in said guideway and projecting beyond the adjacent end of the tubular element, this second element being non-circular in cross section to conform to the guideway 11. The outer end of the element 10 is rigidly connected to the inner coupling member 13 of a universal joint 14, the outer coupling member 15 of said joint having means whereby it may be quickly and easily attached to a driving member, this means being here shown as a socket member 16 adapted to receive one of the driving elements 17 of a multiple spindle drill head, as shown in Fig. 6. The outer end of the slidable element 12 is connected with the coupling member 18 of a second universal joint 19, the other coupling member 20 of which is provided with means, such as a socket 21, by which it may be connected with a driven member, such as a spindle 21a of Fig. 6. The socket members 16 and 21 are preferably angular in cross section to provide non-rotatable connections with the driving and driven members, which connections may be made or broken by merely slipping the sockets onto or off of the respective members, but it will be obvious that the connecting elements may be of any suitable kind which permits quick and easy connection and detachment. The two elements of the unit being slidably connected one with the other are, of course, extensible and due to the non-circular form of the guideway and other slidable element they are caused to rotate in unison. Interposed between the tubular element 10 and the slidable element 12 is a spring 22 which tends constantly to impart outward movement to the element 12 and thus extend the driving unit as a whole. The spring may take various forms and may be arranged in various ways but in the present instance it is shown as a coiled spring bearing at one end against the inner end of the element 12 and bearing at its other end against a closure 23 for the outer end of the tubular element 10, that closure being in the present instance a portion of the coupling member 13 which extends into the tubular element. The coiled spring is of considerable length and to prevent the distortion of the same it is mounted about a rod 24 supported in the tubular element and preferably extending into an axial bore 25 in the inner end portion of the element 12. In the present arrangement the outer end of the rod extends into a recess 26 in the closure 23 and is secured therein by a pin 27. Means are provided to prevent the element 12 from being moved entirely out of the tubular element 10 by the action of the spring, and thus separating the two parts of the device, this means being releasable to permit the easy assembling and disassembling of the device. It is shown in Fig. 1 as comprising a snap ring 28 mounted in a circumferential groove 29 in the end portion of the tubular element and having an inturned end portion 30 which extends through an opening 31, adjacent the end of the tubular element, into the path of a shoulder 32 on the element 12. As shown in Fig. 1 this shoulder is formed by cutting away a portion of one corner of the square element 12, the shoulder being spaced just far enough from the inner end of the element 12 to permit the substantially full extension of the device without permitting the separation of the two elements. The locations of the shoulder 32 and the detent 30 are so selected that the two elements can be assembled only when the inner coupling members of the two universal joints are in proper relative positions, that is, when the corresponding jaws of the two inner coupling members are in the same plane, in order that the unit may properly function. If the two elements were otherwise assembled the unit would not function properly and the two elements would be separated by the expansion of the spring.

In Figs. 3, 4, and 5 I have shown a slightly modified form of the unit in which the tubular element 33 is formed in one piece with the coupling element 34 of a universal joint 35, the other element 36 of said joint being provided with a socket to receive a driving member. The element 33 is provided with an axial cylindrical bore 37 of such diameter as to provide the element with a relatively thick cylindrical wall. The second element 38, which is slidably mounted in the tubular element 33, is cylindrical in form and is rigidly secured to the coupling member 39 of a second universal joint 40 and may, if desired, be formed integral with that coupling member. The other coupling member 41 of the joint 40 is provided with a socket 42 to receive the driven member and this socket may, if desired, be formed integral with the coupling member 41. The two coupling members have cooperating parts which connect them for rotation in unison without interfering with their relative longitudinal movements. As best shown in Fig. 4, a projection or key 43 secured to the inner end portion of the element 38 extends into a longitudinal keyway 44 in the outer element 33. In this form of the device separation of the two elements is normally prevented in the same manner as in the device of Fig. 1, that is by a snap ring 45 having an inturned end portion 46 which extends into the bore of the element 33 and into a longitudinal groove 47 in the element 38 the inner end portion of which forms a shoulder 48 to engage the inturned end of the snap ring. The element 38 is provided in its inner portion with a longitudinal bore 49 and a coiled spring 50 extends into this bore and is confined between the end wall of the bore and the opposite end of the tubular element 33, and thus tends constantly to extend the structure. A rod 51 mounted in the outer end of the tubular element 33 extends through the spring to prevent the distortion of the latter. Both universal joints are preferably provided wtih flexible covers 52 and 53 to exclude dirt or foreign matter from the bearings of the joints and to contain a lubricant for the joints.

A typical installation is shown in Fig. 6 where driving units embodying the invention have been substituted for the usual connections between the driving members and spindles of a multiple spindle drill head. While only two units are shown this drill head has eight spindles all or any part of which may be provided with driving units and are operative simultaneously.

The means for attaching the connecting device with a spindle or other driving member is such that the device may be very quickly and easily attached to or detached from the driving member without disturbing adjacent parts of the drill press, or other machine, even though the driving member may be very close to other driving members or other parts of the machine. It is only necessary to impart an axial movement to the connecting member 13 in order to attach it to the driving member. The universal joints permit the connecting device to extend in alinement with or at an angle to the driving member, thus enabling the driven member to be properly positioned with relation to the work even though the working point is out of line with the driving member. The spring tends constantly to extend the unit and maintain the connections between the same and the driving and driven members, and to provide increased length when the unit extends at an angle to the driving member. To remove the unit it is only necessary to contract the same and slip the sockets off the driving and driven members, which can be quickly and easily accomplished. The construction of the device is very simple and is such as to permit the several parts to be easily formed and assembled or disassembled and will thus permit the device to be produced at a relatively low cost.

While I have shown and described one embodiment of my invention, together with a minor modification thereof, I wish it to be understood that I do not desire to be limited to the details thereof as various modifications may occur to a person skilled in the art.

Having now fully described my invention what I claim as new and desire to secure by Letters Patent is:

1. In a flexible driving unit comprising a tubular element, a second element slidably mounted in said tubular element and held aginst rotation with relation thereto, and means for connecting said elements respectively with a rotatable driving member and a rotatable driven member, said second element having a longitudinal bore in the inner end portion thereof, a rod connected at one end with said tubular element and extending into the bore in said second element, and a coiled spring mounted about said rod and confined between said elements.

2. In a flexible driving unit comprising a tubular element, a second element slidably mounted in said tubular element and held against rotation with relation thereto, and means for connecting said elements respectively with a rotatable driving member and a rotatable driven member, a spring in said tubular element acting on said second element to impart relative longitudinal movement to said elements, said second element having a shoulder adjacent its inner end, a resilient member mounted about said tubular element and having a part extending through the wall of said tubular element into the path of said shoulder.

3. In a flexible driving unit comprising a tubular element, a second element slidably mounted in said tubular element and held against rotation with relation thereto, and means for connecting said elements respectively with a rotatable driving member and a rotatable driven member, said second element having a longitudinal bore in the inner portion thereof, a rod supported by said tubular element and extending into the bore in said second element, a coiled spring mounted about said rod and confined between said elements, and releasable means to normally prevent the separation of said elements by said spring.

4. In a flexible driving unit comprising a tubular element, a second element slidably mounted in said tubular element and held against rotation which relation thereto, and means for connecting said elements respectively with a rotatable driving member and a rotatable driven member, said second element having a longitudinal bore, a spring supported in said tubular element and in the bore in said second element and confined between said elements to impart relative longitudinal movement thereto, said second element having a longitudinal groove in the exterior surface thereof and terminating adjacent the inner end thereof, and a detent movably supported on the first mentioned element and extending in to said groove.

5. In a flexible driving unit, a tubular element, a second element slidably mounted in said tubular element and held against rotation with relation thereto, a spring in said tubular element acting on said second element to impart relative longitudinal movement to said elements, universal joints at the outer ends of said elements and each comprising two coupling members having jaws in intersecting planes, the inner coupling members of said joints being rigid with and in alinement with the corresponding elements, and the outer coupling members of said joints having means whereby they may be connected respectively with a rotatable driving member and a rotatable driven member, a portion of said second element being cut away to provide the latter with a shoulder adjacent the inner end thereof, and a detent carried by said tubular element on the outer side of said shoulder, said detent and said shoulder being so arranged with relation to said universal joints that said elements can be assembeld only when the corresponding jaws of said inner coupling members are in the same plane.

GEORGE B. STILLWAGON, JR.

REFERENCES CITED

The following references are of record in the file of this patent:

UNITED STATES PATENTS

| Number | Name | Date |
|---|---|---|
| 514,990 | Habersang et al. | Feb. 20, 1894 |
| 1,097,678 | Scott | May 26, 1914 |
| 1,166,830 | Gridley | Jan. 4, 1916 |
| 1,381,214 | Mohr | June 14, 1921 |
| 1,617,512 | Ruffner | Feb. 15, 1927 |
| 1,828,087 | Vlcek | Oct. 20, 1931 |
| 2,468,182 | Dempsey | Apr. 26, 1949 |

FOREIGN PATENTS

| Number | Country | Date |
|---|---|---|
| 216,906 | Great Britain | of 1924 |